United States Patent Office 2,972,508

Patented Feb. 21, 1961

1

2,972,508

DYEING OF POLYMERS OF ACRYLONITRILE

Winfried Kruckenberg, Ludwig Nussler, and Josef Singer, Leverkusen-Bayerwerk, and Helmut Kleiner, Koln-Stammheim, Germany, assignors to Farbenfabriken Bayer Aktiengesellschaft, Leverkusen, Germany, a corporation of Germany No Drawing. Filed Dec. 13, 1956, Ser. No. 627,990

Claims priority, application Germany Dec. 29, 1955

6 Claims. (Cl. 8—41)

The present invention relates to the dyeing of polymers of acrylonitrile; more particularly it relates to a process for dyeing articles comprising acrylonitrile polymers with azo dyestuffs containing at least one externally bound amino group.

As articles comprising acrylonitrile polymers there may be mentioned fibres, filaments, fabrics, moulded articles and the like. Also acrylonitrile copolymers containing at least 85% by weight of acrylonitrile can be dyed according to the invention.

It is an object of this invention to provide a process for dyeing articles prepared from acrylonitrile polymers containing at least 85% by weight of acrylonitrile. A further object is the provision of dyed acrylonitrile polymers and copolymers, the dyeings obtained being distinguished by good fastness properties.

According to the invention it has been found that azo dyestuffs, free of carboxylic acid and sulfonic acid groups, which contain an amino group bound to an aromatic nucleus through an ethylene amino group; i.e., $$\mathrm{Aryl{-}\overset{|}{N}{-}CH_2CH_2{-}\overset{|}{N}{-}}$$

can be used with advantage for dyeing polymers or copolymers based on acrylonitrile. These azo dyestuffs may contain the amino groups as primary, secondary or tertiary amino group or as quaternary ammonium base.

By the term "non-aromatically linked" or "externally bound" amino groups we understand amino groups which are not attached to an aromatic nucleus but are attached to a terminal (external) radical of the dyestuff molecules.

The monoazo dyestuffs used according to the invention may belong to the benzene-azobenzene series, benzene-azo-naphthalene series, benzene-azo-arylpyrazolone series, benzene-azo-acylacetic acid-aryl- and alkyl-amide or to the heterocyclic series. They are prepared in usual manner by coupling diazotized amines with azo components. The non-aromatically bound amino groups may be contained either in the diazo- or in the azo component. The quaternary ammonium compounds are obtained from the tertiary amines, for example by reacting with alkyl halides.

Dyestuffs which bear more than one externally linked amino group in the molecule may also be used. In addition to the said groups, the azo dyestuffs may also carry other substituents which are common in azo chemistry with the exception of sulfonic acid and carboxylic acid groups.

Some of the dyestuffs used in accordance with the invention are new.

The following diazotized amines are suitable for example for preparing the azo dyestuffs to be used according to the invention:

1-amino-4-methylbenzene,
1-amino-2,4-dicyanobenzene,

2

1-amino-2,4-dicyano-6-methylbenzene,
1-amino-3-chloro-4-cyanobenzene,
1-amino-2,4-dichlorobenzene,
1amino-4-methoxybenzene,
1-amino-3,5-dichloro-4-cyanobenzene,
1-amino-2-cyano-4-chlorobenzene,
1-amino-4-nitrobenzene,
1-amino-4-(dimethylamino)-ethylbenzene,
1-aminobenzene-4-carboxylic acid-(dimethylamino)-ethylester,
1-aminobenzene-4-carboxylic acid-methylester.

Suitable coupling components are for example:

1-hydroxy-4-methylbenzene,
1-(dimethylamino-ethyl)-aminobenzene,
1-(dimethylamino-ethyl)-amino-3-methylbenzene,
1-(diethylamino-ethyl)-amino-3-methylbenzene,
1-(dimethylaminoethyl)-ethylamino-3-methylbenzene,
1-(dimethylamino-ethyl)-butylaminobenzene,
1-(diethylamino-ethyl)-ethylamino-3-methylbenzene,
1-(dimethyl-amino-ethyl)-hydroxy-ethylamino-3-methylbenzene,
1-(dimethylamino-ethyl)-ethylamino-2-methoxy-5-methylbenzene,
1-(dimethylamino-ethyl)-amino-2-methoxy-5-methylbenzene,
1-(dimethylamino-ethyl)-amino-2,5-dimethoxybenzene, and the ammonium salts such as the quaternary products of these compounds, 2-hydroxynaphthalene,
2-hydroxynaphthalene-3-carboxylic acid-(dimethylamino)-ethylester,
2-hydroxynaphthalene-3-carboxylic acid-methylester,
1-phenyl-3-methylpyrazolone-(5),
py-tetrahydro-3,6′-dihydroxy-7,8,1′,2′-benzoquinoline,
N-methyl-N-β-aminoethylaminobenzene,
1-(N-ethyl-N-amino-ethyl)-amino-3-methylbenzene,
1-(N-β-methylamino-ethyl)-amino-3-methylbenzene,
1-(N-ethyl-N-β-methylamino-ethyl)-amino-3-methylbenzene,
1-(N-ethyl-N-β-amino-ethyl)-amino-3-methylbenzene,
1-(N-β-amino-ethyl)-amino-3-methylbenzene.

The monoazo dyestuffs to be used according to the present invention are readily soluble in water in the form of their salts. The dyestuffs show a good affinity to polyacrylonitrile fibres.

The dyestuffs are applied onto the polyacrylonitrile fibre in usual manner, for example from an acid solution. The dyeings thus obtained excel in good fastness properties.

The following examples are given for the purpose of illustrating the invention.

*Example 1*

1 gram of the dyestuff obtained from diazotized 1-amino-2,4-dicyanobenzene and 1-(N-dimethylamino-ethyl-N-ethyl)-amino-3-methylbenzene in the form of its chloroacetate is dissolved in 3 litres of water until clear and the solution treated with 3 grams of a 30 percent acetic acid. 100 grams of polyacrylonitrile fibre are immersed in the dye bath at 40–50° C., the bath is brought to 100° C. within 40 minutes and boiled for one hour and dried. The fibre is then rinsed in water. A clear red dyeing is thus obtained having a good fastness to washing and to light.

*Example 2*

1 gram of the dyestuff obtained from diazotized 1- amino-2-cyano-5-chlorobenzene and 1-(N-dimethylaminoethyl)-amino-3-methylbenzene in the form of its oxalate is dissolved in 3 litres of water until clear and treated with 3 grams of a 30 percent formic acid and 2 percent of sodium acetate. 100 grams of polyacrylonitrile fibre are then introduced into the dye bath at 40–50° C., the bath is brought to 100° C. within 40 minutes and boiled for one hour. A clear orange-colored dyeing is obtained having good fastness to washing and to light.

In the same manner dyeings of good fastness properties are obtained on polyacrylonitrile fibres with the dyestuffs of the following table:

| Dyestuff | shade of the dyeing on polyacrylonitrile fibres |
|---|---|
| 3. 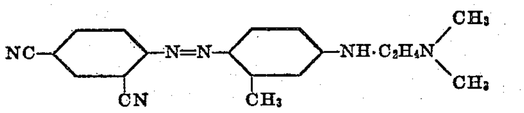 | strongly reddish orange. |
| 4. 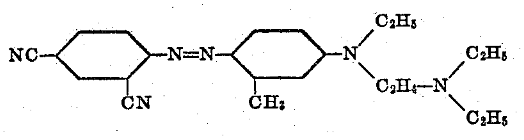 | red. |
| 5. 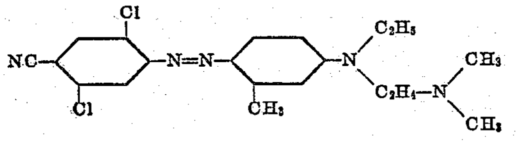 | brick red. |
| 6. 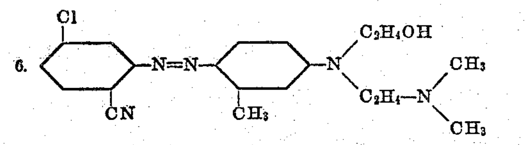 | reddish orange. |
| 7. 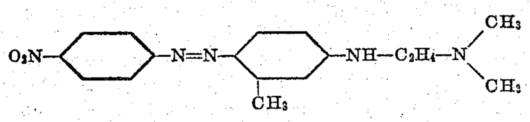 | Do. |
| 8. 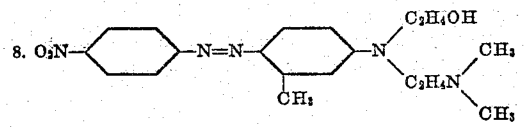 | strongly reddish orange. |
| 9. 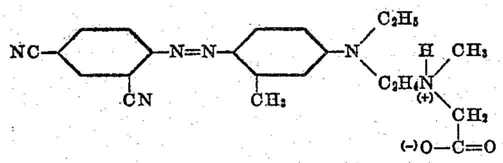 | yellowish red. |
| 10. 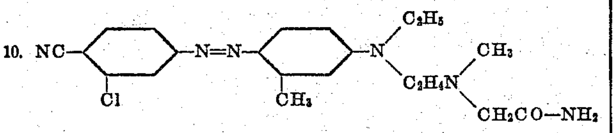 | orange. |

*Example 11*

In a dye bath which contains 1 percent of the dyestuff having the following formula

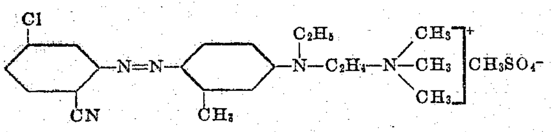

referred to the weight of the fibre, 3 grams of polyacrylonitrile fibre are dyed with the addition of 3 percent of acetic acid (referred to the weight of the material to be dyed) using a liquor-to-goods ratio of 40:1. The material is introduced at 40–50° C., brought to the boil within 20–30 minutes and boiled for one hour. It is then rinsed and dried. A yellowish red is thus obtained having good fastness to light and wetting and particularly to ironing and sublimation.

*Example 12*

In a dye bath containing 1 percent of the dyestuff of the following formula

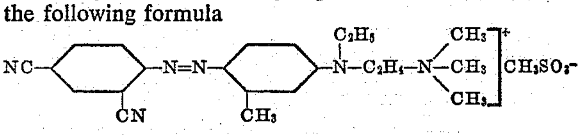

referred to the weight of the fibre, 5 grams of polyacrylonitrile fibre are dyed with the addition of 2 percent of soda (referred to the weight of the material to be dyed) using a liquor-to-goods ratio of 40:1. At 40–50° C. the material is immersed in the dye bath which is brought to the boil within 20–30 minutes and boiled for one hour. It is then rinsed and dried. A bordeaux is thus obtained having good fastness to light and wetting and particularly to ironing and sublimation.

Valuable dyeings on polyacrylonitrile fibres are also obtained if using in this example 0.15 to 1.5% by weight of the article to be dyed of an organic acid, preferably acetic acid or formic acid, and/or heating the dye bath to a temperature of from 105° C. to 115° C. under pressure and/or using the dyestuffs indicated in the following table:

| Dyestuff | shade of the dyeing on polyacrylonitrile fibres |
|---|---|
| 13. 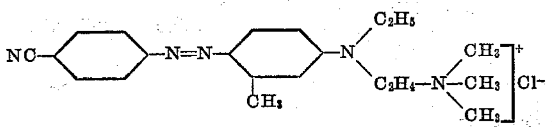 | strongly yellowish orange. |
| 14. 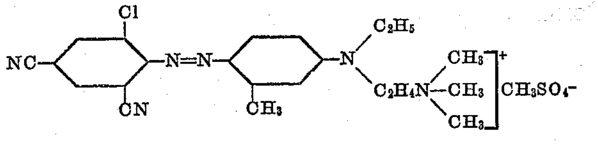 | red-bordeaux. |
| 15. 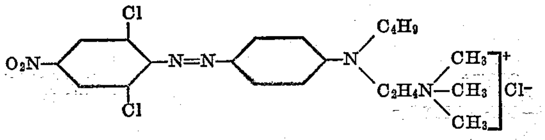 | brownish orange. |
| 16. 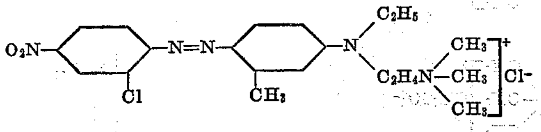 | bluish red. |
| 17. 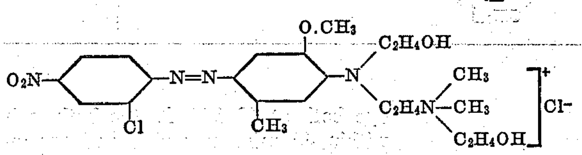 | reddish brown. |
| 18. 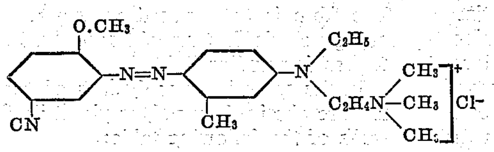 | strongly reddish yellow. |
| 19. 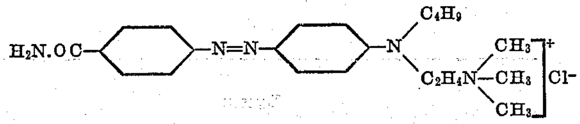 | Do. |
| 20. 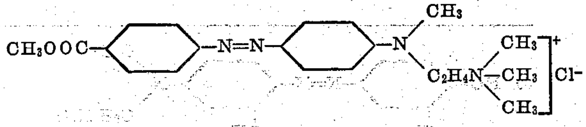 | Do. |
| 21. 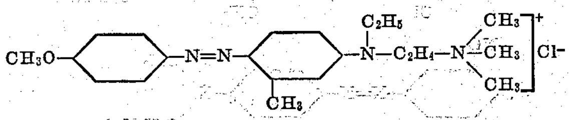 | reddish yellow. |
| 22. 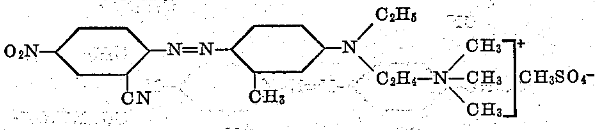 | bordeaux. |
| 23. 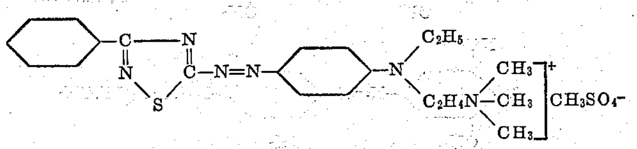 | bluish red. |
| 24. 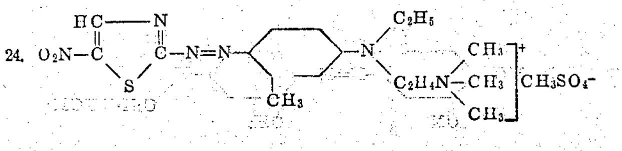 | reddish blue. |

| Dyestuff | shade of the dyeing on polyacrylonitrile fibres |
|---|---|
| 25. 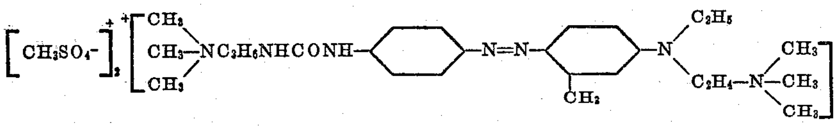 | yellow. |
| 26. 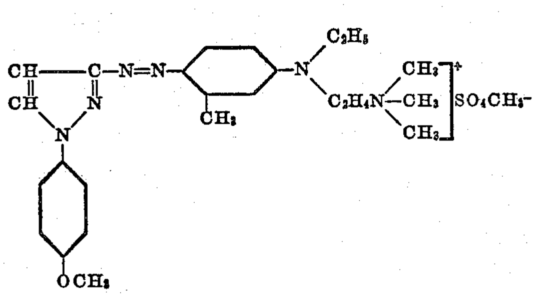 | Do. |
| 27. 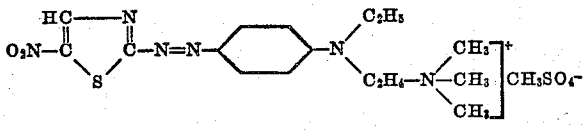 | strongly bluish violet. |
| 28. 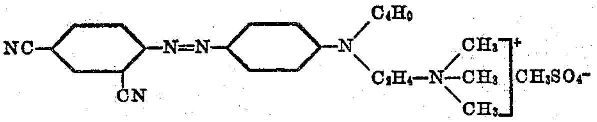 | scarlet. |

*Example 29*

1 gram of the dyestuff obtained from diazotized 1-amino-2,5-dicyanobenzene- and 1-(N-β-methylamino-ethyl)-amino-3-methylbenzene in the form of its chloro-acetate is dissolved in 3 litres of water until clear and the solution treated with 3 grams of a 30% acetic acid. 100 grams of polyacrylonitrile fibre are immersed in the dye bath at 40–50° C., the bath is brought to 100° C. within 40 minutes and boiled for one hour and dried. The fibre is then rinsed in water. A clear yellowish orange shade is thus obtained having a good fastness to washing and to light.

In the same manner dyeings of good fastness properties are obtained on polyacrylonitrile fibres with the dyestuffs of the following table:

| Dyestuff | shade of the dyeing on polyacrylonitrile fibres |
|---|---|
| 30. 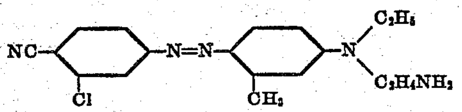 | orange. |
| 31. 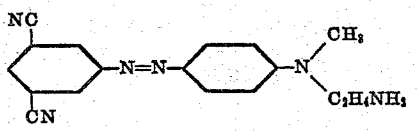 | strongly yellowish orange. |
| 32. 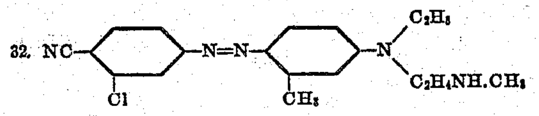 | orange. |
| 33. 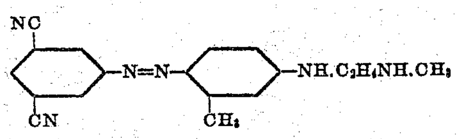 | very strongly yellowish orange. |
| 34. 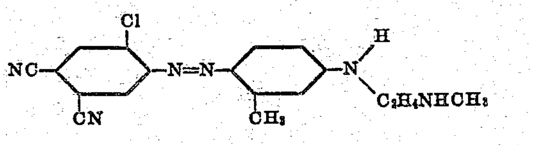 | brick-red. |

| Dyestuff | shade of the dyeing on polyacrylonitrile fibres |
| --- | --- |
| 35. 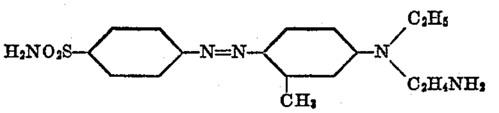 | reddish orange. |
| 36. 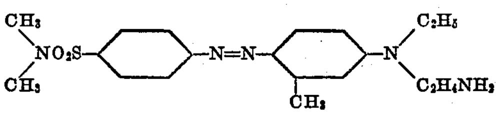 | Do. |

*Example 37*

183 grams of 5-chloro-2-cyano-aniline are introduced with good stirring in 1620 grams of concentrated sulfuric acid (66° Bé.) and 204 millilitres of nitrosylsulfuric acid. The mixture is stirred into a solution of 1.2 mols of an azo compound having the formula:

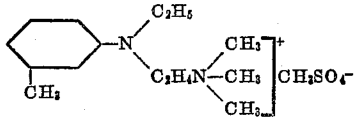

which is obtained by reacting 1-N-ethyl-N(β-dimethylaminoethyl)-amino-3-methylbenzene with dimethyl sulfate in alkaline medium, 10 grams of amido sulfonic acid and 600 millilitres of water with the addition of ice. The reaction mixture is then neutralized with soda lye. After stirring for 1 hour, the mixture is heated to 60° C. and cooled down overnight. The monoazo dyestuff thus obtained is then precipitated, filtered and dried. It corresponds to the formula:

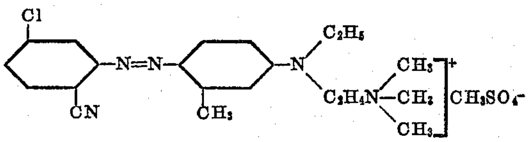

and has a melting point of 155° C.

The other dyestuffs which are to be used in accordance with the invention can be produced in the same manner as described above, if equivalent amounts of diazo and azo components are employed.

What we claim is:

1. A polyacrylonitrile article containing at least 85% by weight of acrylonitrile, said article being dyed with a monoazo dyestuff of the formula

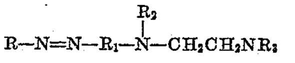

wherein R stands for a member selected from the groups consisting of benzene radicals and heterocyclic radicals; $R_1$ stands for a member selected from the groups consisting of benzene radicals, naphthalene radicals, acylacetic acid amide radicals and heterocyclic radicals, $R_2$ stands for a member selected from the group consisting of hydrogen, lower alkyl and hydroxyl lower alkyl, and $NR_3$ stands for a member selected from the groups consisting of primary amino, secondary amino, tertiary amino and quaternary ammonium radicals.

2. A polyacrylonitrile article containing at least 85% by weight of acrylonitrile, said article being dyed with a monoazo dyestuff of the formula

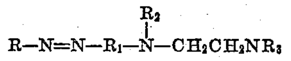

wherein R and $R_1$ are each benzene radicals, $R_2$ is a lower alkyl and $NR_3$ is a quaternary ammonium radical.

3. A polyacrylonitrile article containing at least 85% by weight of acrylonitrile, said article being dyed with a a monoazo dyestuff corresponding to the formula

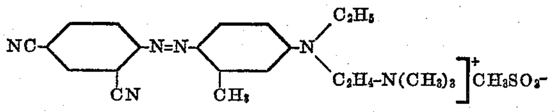

4. A polyacrylonitrile article containing at least 85% by weight of acrylonitrile, said article being dyed with a monoazo dyestuff corresponding to the formula

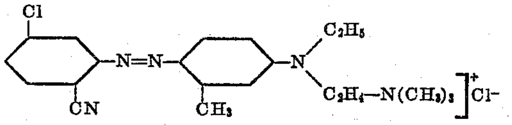

5. A polyacrylonitrile article containing at least 85% by weight of acrylonitrile, said article being dyed with a monoazo dyestuff corresponding to the formula

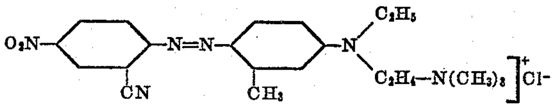

6. A polyacrylonitrile article containing at least 85% by weight of acrylonitrile, said article being dyed with a monoazo dyestuff corresponding to the formula

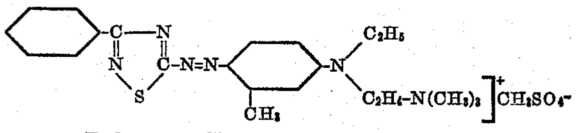

References Cited in the file of this patent

UNITED STATES PATENTS

| | | |
| --- | --- | --- |
| 2,238,485 | Dickey | Apr. 15, 1941 |
| 2,821,526 | Boyd | Jan. 28, 1958 |

FOREIGN PATENTS

| | | |
| --- | --- | --- |
| 203,214 | Australia | Sept. 6, 1956 |

OTHER REFERENCES

Clarke: Amer. Dyestuff Reporter, August 29, 1955, p. 631.

Amer. Dyestuff Reporter for May 9, 1955, p. P323; art. by W. H. Hindle.